(12) United States Patent
Kirby et al.

(10) Patent No.: US 9,890,089 B2
(45) Date of Patent: Feb. 13, 2018

(54) COMPOSITIONS AND METHODS FOR THERMAL SPRAYING A HERMETIC RARE EARTH ENVIRONMENTAL BARRIER COATING (71) Applicant: GENERAL ELECTRIC COMPANY, Schenectady, NY (US)

(72) Inventors: Glen Harold Kirby, Liberty Township, OH (US); Nicholas Edward Antolino, Schenectady, NY (US); Luc Stephane Leblanc, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 635 days.

(21) Appl. No.: 14/204,367

(22) Filed: Mar. 11, 2014

(65) Prior Publication Data

US 2016/0108510 A1 Apr. 21, 2016

(51) Int. Cl.
*C04B 41/52* (2006.01)
*C04B 41/89* (2006.01)
(Continued)

(52) U.S. Cl.
CPC ........ *C04B 41/5045* (2013.01); *C04B 41/009* (2013.01); *C04B 41/52* (2013.01);
(Continued)

(58) Field of Classification Search
CPC ... F01D 5/288; F01D 11/122; C04B 41/5024; C23C 28/042
See application file for complete search history.

(56) References Cited

U.S. PATENT DOCUMENTS 6,159,553 A * 12/2000 Li ........................ C04B 41/009
427/376.2
2006/0099358 A1 5/2006 Raybould et al.
(Continued)

FOREIGN PATENT DOCUMENTS

EP 1764351 A2 3/2007
EP 2284137 A2 2/2011
(Continued)

OTHER PUBLICATIONS

Solid solubility of Yb2Si2O7 in β-, γ- and δ-Yb2Si2O7, Fernández-Carrión et al, Journal of Solid State Chemistry, vol. 184, 2011, p. 1882-1889.*
(Continued)

*Primary Examiner* — Aaron Austin
*Assistant Examiner* — Zheren J Yang
(74) *Attorney, Agent, or Firm* — John P. Darling (57) ABSTRACT A rare earth silicate-based hermetic layer includes a thermal sprayed coating including a rare earth silicate having a hermetic microstructure. An environmental barrier coating includes a bond coat layer including silicon; and at least one rare earth silicate-based hermetic layer deposited on the bond coat layer by thermal spraying. The rare earth silicate-based hermetic layer includes a thermal sprayed coating including a rare earth silicate having a hermetic microstructure. An article for service in extreme environments may be provided with such an environmental barrier coating. A thermal spray feedstock for producing a rare earth silicate-based hermetic layer.

13 Claims, 6 Drawing Sheets (51) Int. Cl.
  *C04B 41/50* (2006.01)
  *C23C 4/02* (2006.01)
  *C23C 4/18* (2006.01)
  *C23C 4/11* (2016.01)
  *C23C 4/129* (2016.01)
  *C23C 4/134* (2016.01)
  *C23C 4/04* (2006.01)
  *C23C 4/12* (2016.01)
  *C04B 41/00* (2006.01)
  *F01D 5/28* (2006.01)

(52) U.S. Cl.
  CPC ............... *C04B 41/89* (2013.01); *C23C 4/02* (2013.01); *C23C 4/04* (2013.01); *C23C 4/11* (2016.01); *C23C 4/12* (2013.01); *C23C 4/129* (2016.01); *C23C 4/134* (2016.01); *C23C 4/18* (2013.01); *F01D 5/288* (2013.01); *F05D 2300/15* (2013.01); *F05D 2300/211* (2013.01)

(56) References Cited

U.S. PATENT DOCUMENTS

| | | | | |
|---|---|---|---|---|
| 2008/0145643 | A1* | 6/2008 | Reynolds | C23C 4/10 428/316.6 |
| 2009/0162632 | A1* | 6/2009 | Kirby | C23C 30/00 428/304.4 |
| 2009/0220776 | A1* | 9/2009 | Meschter | C04B 41/009 428/335 |
| 2009/0274850 | A1 | 11/2009 | Bhatia et al. | |
| 2009/0297118 | A1 | 12/2009 | Saraffi-Nour et al. | |
| 2010/0129636 | A1* | 5/2010 | Cybulsky | C04B 41/009 428/310.5 |
| 2010/0129673 | A1 | 5/2010 | Lee | |
| 2010/0154422 | A1 | 6/2010 | Kirby et al. | |
| 2010/0159151 | A1* | 6/2010 | Kirby | C04B 41/009 427/452 |
| 2010/0255260 | A1 | 10/2010 | Lee et al. | |
| 2011/0027470 | A1* | 2/2011 | Kirby | C04B 41/009 427/142 |
| 2011/0203281 | A1* | 8/2011 | Sarrafi-Nour | C23C 26/00 60/722 |
| 2011/0217511 | A1 | 9/2011 | Kirby et al. | |
| 2013/0089673 | A1 | 4/2013 | Kirby et al. | |
| 2013/0122259 | A1* | 5/2013 | Lee | C23C 30/00 428/164 |
| 2013/0136915 | A1* | 5/2013 | Naik | C04B 41/009 428/312.6 |
| 2014/0072816 | A1* | 3/2014 | Lee | C04B 41/009 428/448 |
| 2014/0199163 | A1* | 7/2014 | Lee | C23C 28/04 415/174.4 |
| 2014/0261080 | A1* | 9/2014 | Lee | C04B 41/009 106/286.5 |
| 2014/0272197 | A1* | 9/2014 | Lee | C04B 41/009 427/596 |
| 2015/0267058 | A1* | 9/2015 | Lee | C09D 1/00 428/335 |

FOREIGN PATENT DOCUMENTS

| | | | | |
|---|---|---|---|---|
| EP | 2289863 | A2 | 3/2011 | |
| WO | WO 2011137244 | A1 * | 11/2011 | ........... C04B 41/009 |
| WO | WO 2012027442 | A1 * | 3/2012 | ........... C04B 41/009 |
| WO | 2014007901 | A2 | 1/2014 | |

OTHER PUBLICATIONS

Lee et al., "Rare earth silicate environmental barrier coatings for SiC/SiC composites and Si3N4 ceramics", Journal of the European Ceramic Society, Volume No. 25, Issue No. 10, pp. 1705-1715, Jan. 21, 2005.

European Search Report and Written Opinion issued in connection with corresponding EP Application No. 15158237.6-1362 dated Jul. 22, 2015.

Nakayama, et al; "Evaluation of environmental barrier coatings for sic/sic composites," Ceramic Engineering and Science Proceedings, 2007, pp. 161-170.

Xu, et al; "Investigation on the preparation of Si/mullite/Yb2Si207 environmental barrier coatings onto silicon carbide," Journal of Rare Earths, 2010, vol. 28 (3), pp. 399-402.

Zhu, et al; "Defect clustering and non-phase structure characterization of multi-component rare earth oxide doped zirconia-yttria thermal barrier coatings," Ceramic Engineering and Science Proceedings, 2003, vol. 24, Issue 3, pp. 525-534.

* cited by examiner

FIG. 7B

COMPOSITIONS AND METHODS FOR THERMAL SPRAYING A HERMETIC RARE EARTH ENVIRONMENTAL BARRIER COATING

TECHNICAL FIELD

Embodiments described herein generally relate to compositions for making environmental barrier coatings and environmental barrier coatings comprising the same. More particularly, embodiments described herein generally relate to environmental barrier coatings that include at least one rare earth silicate-based hermetic layer. Other embodiments are made and densified using at least one sintering aid.

BACKGROUND

Higher operating temperatures for gas turbine engines are continuously being sought in order to improve their efficiency. However, as operating temperatures increase, the high temperature durability of the components of the engine must correspondingly increase. Significant advances in high temperature capabilities have been achieved through the formulation of iron, nickel, and cobalt-based superalloys. While superalloys have found wide use for components used throughout gas turbine engines, and especially in the higher temperature sections, alternative lighter-weight component materials have been proposed.

Ceramic matrix composites (CMCs) are a class of materials that consist of a reinforcing material surrounded by a ceramic matrix phase. Such materials, along with certain monolithic ceramics (i.e. ceramic materials without a reinforcing material), are currently being used for higher temperature applications. These ceramic materials are lightweight compared to superalloys, yet can still provide strength and durability to the component made therefrom. Therefore, such materials are currently being considered for many gas turbine components used in higher temperature sections of gas turbine engines, such as airfoils (e.g. turbines, and vanes), combustors, shrouds and other like components, that would benefit from the lighter-weight and higher temperature capability these materials can offer.

CMC and monolithic ceramic components can be coated with environmental barrier coatings (EBCs) to protect them from the harsh environment of high temperature engine sections. EBCs can provide a dense, hermetic seal against the corrosive gases in the hot combustion environment, which can rapidly oxidize silicon-containing CMCs and monolithic ceramics. Additionally, silicon oxide is not stable in high temperature steam, but is converted to volatile (gaseous) silicon hydroxide species. Thus, EBCs can help prevent dimensional changes in the ceramic component due to such oxidation and volatilization processes. Unfortunately, there can be some undesirable issues associated with standard, industrial coating processes such as plasma spray and vapor deposition (i.e. chemical vapor deposition, CVD, and electron beam physical vapor deposition, EBPVD) currently used to apply EBCs.

Figure 1:
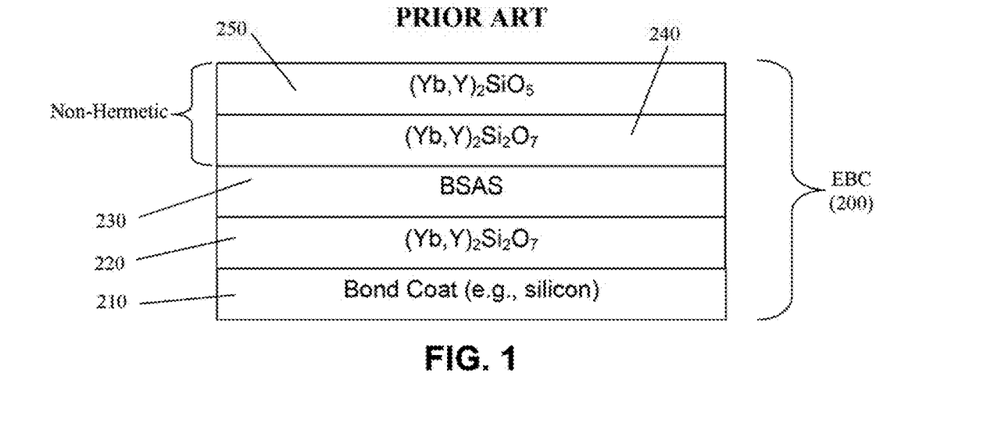
FIG. 1 is a schematic cross sectional view of an environmental barrier coating in the prior art. As shown, environmental barrier coating 200 has bond coat 210 (e.g., silicon), non-hermetic (Yb,Y)$_2$Si$_2$O$_7$ layer 220, BSAS layer 230, non-hermetic (Yb,Y)$_2$Si$_2$O$_7$ layer 240, and non-hermetic (Yb,Y)$_2$SiO$_5$ layer 250.

A typical air plasma spray (APS) microstructure for a rare earth disilicate is porous in the deposited state and is not hermetic toward the gaseous species that cause volatilization of the ceramic matrix composite. Therefore, a glassy layer such as barium strontium alumino-silicate (BSAS) is sprayed to provide a hermetic layer toward these gaseous species. However, this glassy layer cannot contact a silicon source such as silicon or silica and thus an additional layer of rare earth silicate must be sprayed to separate the glassy layer from the silica source. FIG. 1 is an illustration of an example of a prior art EBC having non-hermetic rare earth silicate-based layers in combination with BSAS.

Accordingly, there remains a need for environmental barrier coatings to protect CMCs from the high temperature steam environments present in gas turbine engines.

The present system and techniques are directed to overcoming these and other deficiencies in the art.

SUMMARY

According to one aspect, the present disclosure provides a rare earth silicate-based hermetic layer. The rare earth silicate-based hermetic layer comprises a thermal sprayed coating comprising a rare earth silicate having a hermetic microstructure having a density of 85% or more of its theoretical density.

According to another aspect, the present disclosure provides an environmental barrier coating comprising: a bond coat layer comprising silicon; and at least one rare earth silicate-based hermetic layer deposited on the bond coat layer by thermal spraying. The rare earth silicate-based hermetic layer comprises a thermal sprayed coating comprising a rare earth silicate having a hermetic microstructure having a density of 85% or more of its theoretical density.

According to another aspect, the present disclosure provides an article having an environmental barrier coating, where the article comprises: a substrate comprising a ceramic matrix composite; and an environmental barrier coating deposited on a surface of the substrate. The environmental barrier coating of the article comprises: a bond coat layer comprising silicon; and at least one rare earth silicate-based hermetic layer deposited on the bond coat layer by thermal spraying, wherein said rare earth silicate-based hermetic layer comprises a thermal sprayed coating comprising a rare earth silicate having a hermetic microstructure having a density of 85% or more of its theoretical density. In certain embodiments, a non-hermetic layer is deposited between the bond coat layer and the at least one rare earth silicate-based hermetic layer of the environmental barrier coating of the article. An example of a suitable non-hermetic layer for use in the environmental barrier coating of the article can include, without limitation, a non-hermetic layer comprising a rare earth silicate that can be, without limitation, $(Yb_x, Y_{1-x})_2Si_2O_7$ where $0 \le x \le 1$.

According to another aspect, the present disclosure provides a thermal spray feedstock for producing a rare earth silicate-based hermetic layer. The thermal spray feedstock comprises a suspension comprising a rare earth silicate and a sintering aid suspended in a liquid carrier, where the sintering aid comprises an oxide or a plurality of oxides, and where thermal spraying of the suspension is effective to yield a rare earth silicate-based hermetic layer comprising a rare earth silicate having a hermetic microstructure having a density of 85% or more of its theoretical density. In one embodiment, the thermal spray feedstock further comprises a surfactant.

According to another aspect, the present disclosure provides a method for making a rare earth silicate-based hermetic layer. This method includes the following steps: providing a thermal spray feedstock according to the present disclosure; and subjecting the thermal spray feedstock to a thermal spraying process to produce a rare earth silicate-based hermetic layer comprising a rare earth silicate having a hermetic microstructure having a density of 85% or more of its theoretical density.

According to another aspect, the present disclosure provides a method for producing a substrate having an environmental barrier coating. This method includes the following steps: providing a substrate comprising a ceramic matrix composite; and applying an environmental barrier coating to the substrate. The environmental barrier coating includes: a bond coat layer comprising silicon; and at least one rare earth silicate-based hermetic layer deposited on the bond coat layer by thermal spraying. The rare earth silicate-based hermetic layer comprises a thermal sprayed coating comprising a rare earth silicate having a hermetic microstructure having a density of 85% or more of its theoretical density. In certain embodiments of this method, a non-hermetic layer is deposited between the bond coat layer and the at least one rare earth silicate-based hermetic layer of the environmental barrier coating of the article. An example of a suitable non-hermetic layer for use in the environmental barrier coating of the article can include, without limitation, a non-hermetic layer comprising a rare earth silicate that can be, without limitation, $(Yb_x,Y_{1-x})_2Si_2O_7$ where $0 \leq x \leq 1$.

As provided herein, the present disclosure describes a chemical composition that allows an environmental barrier coating (EBC) to be thermally sprayed to a hermetic state. The present disclosure provides for reducing the number of EBC layers necessary to protect a ceramic matrix composite (CMC), for example from five to three. In one embodiment, the present disclosure involves the addition of iron oxide, aluminum oxide, or any other sintering aid for a rare earth (e.g., Yb, Y, Sc, Lu, etc.) silicate to the thermal spray feedstock material. These sintering aides reduce the sintering temperature of the rare earth silicate substantially, which allow the coating to sinter in-situ to a hermetic density (typically >85% of the theoretical rare earth silicate density). As provided herein, sintering can also be carried out ex-situ.

As described herein, the present disclosure provides a means for lowering the sintering temperature of rare-earth silicate materials such as (Yb and/or Y)$_2$Si$_2$O$_7$ and (Yb and/or Y)$_2$SiO$_5$. Thus, the thermal spray layer deposited with a sintering aid eliminates the need for the glassy layer and the separation layer.

These and other objects, features, and advantages of the present methods, systems, and techniques will become apparent from the following detailed description of the various aspects of the present disclosure taken in conjunction with the accompanying drawings.

BRIEF DESCRIPTION OF THE DRAWINGS

While the specification concludes with claims particularly pointing out and distinctly claiming the invention, it is believed that the embodiments set forth herein will be better understood from the following description in conjunction with the accompanying figures, in which like reference numerals identify like elements.

FIG. 6A corresponds to Sample H2-1344. FIG. 6B corresponds to Sample H4-1315-50. FIG. 6C corresponds to Sample P2-1344.

FIG. 7A corresponds to Sample H5-1344 and was steam tested. FIG. 7B corresponds to Sample P3-1344 and was steam tested.

DETAILED DESCRIPTION

The present disclosure generally relates to a rare earth silicate-based hermetic layer, environmental barrier coatings comprising the rare earth silicate-based hermetic layer, articles having an environmental barrier coating as disclosed, thermal spray feedstocks for producing the rare earth silicate-based hermetic layer, methods of making the rare earth silicate-based hermetic layer, and methods of using the rare earth silicate-based hermetic layer. In general, hermeticity is achieved after heat treatment of the thermal spray layer. As used herein, heat treatment of the thermal spray layer can be conducted either in-situ or ex-situ.

According to one aspect, the present disclosure provides a rare earth silicate-based hermetic layer. The rare earth silicate-based hermetic layer comprises a thermal sprayed coating comprising a rare earth silicate having a hermetic microstructure having a density of 85% or more of its theoretical density. In various other embodiments, the rare earth silicate-based hermetic layer comprises a thermal sprayed coating comprising a rare earth silicate having a hermetic microstructure having a density of 90% or more of its theoretical density, 95% or more of its theoretical density, or 97% or more of its theoretical density.

As provided herein, in certain embodiments, the hermetic microstructure of the rare earth silicate-based hermetic layer has a closed porosity. In particular embodiments, the closed porosity comprises a porosity by volume of less than about 15 percent. In various other embodiments, the closed porosity comprises a porosity by volume of less than about 10 percent, less than about 5 percent, or less than about 3 percent. In certain embodiments, the hermetic microstructure comprises a dense rare earth silicate phase and an optional glassy phase. Thus, in one embodiment, the hermetic microstructure comprises a dense rare earth silicate phase and a glassy phase. In another embodiment, the hermetic microstructure comprises a dense rare earth silicate phase without a glassy phase.

As provided herein, in certain embodiments, the thermal sprayed coating has a thickness of between about 5 micrometers and about 1,200 micrometers. In various other embodiments, the thermal sprayed coating has a thickness range of between about 10-1,000 micrometers, 10-800 micrometers, 10-500 micrometers, 10-400 micrometers, 10-300 micrometers, 10-200 micrometers, 10-100 micrometers, 10-50 micrometers, and the like.

As provided herein, the rare earth silicate according to the present disclosure comprises a rare earth element selected from the group consisting of ytterbium (Yb), yttrium (Y), scandium (Sc), lutetium (Lu), lanthanum (La), cerium (Ce), praseodymium (Pr), neodymium (Nd), samarium (Sm), dysprosium (Dy), holmium (Ho), erbium (Er), thulium (Tm), europium (Eu), gadolinium (Gd), terbium (Tb), promethium (Pm), and a mixture thereof. In one embodiment, the rare earth silicate can be $(Yb_x,Y_{1-x})_2Si_2O_7$ where $0 \leq x \leq 1$ or $(Yb_y-Y_{1-y})_2SiO_5$, where $0 \leq y \leq 1$ or a mixture thereof. In a particular embodiment, the rare earth silicate is $(Yb_{0.6}Y_{0.4})_2Si_2O_7$. In various embodiments, the rare earth silicate comprises from about 90 wt % to about 99.5 wt % of the thermal sprayed coating.

In one embodiment, the rare earth silicate-based hermetic layer comprises a first layer comprising a first rare earth silicate and a second layer comprising a second rare earth silicate, wherein the first rare earth silicate is $(Yb_x,Y_{1-x})_2Si_2O_7$ where $0 \leq x \leq 1$ and the second rare earth silicate is $(Yb_y-Y_{1-y})_2SiO_5$, where $0 \leq y \leq 1$. In a particular embodiment, the first rare earth silicate is $(Yb_{0.6}Y_{0.4})_2Si_2O_7$ and the second rare earth silicate is $Y_2SiO_5$.

As provided herein, the hermetic microstructure of the rare earth silicate can be formed by sintering the rare earth silicate in-situ with a sintering aid comprising an oxide or a plurality of oxides. As used herein, suitable sintering aid can include, without limitation, metallic iron, $Al_2O_3$, $Fe_3O_4$, $SiO_2$, $Fe_2O_3$, $LiYO_2$, and the like. In particular embodiments, the plurality of sintering aid oxides comprises metallic iron, $Al_2O_3$, $Fe_3O_4$, and $SiO_2$. In various embodiments, the hermetic microstructure of the rare earth silicate can be formed by sintering the rare earth silicate ex-situ.

According to another aspect, the present disclosure provides an environmental barrier coating comprising: a bond coat layer comprising silicon; and at least one rare earth silicate-based hermetic layer deposited on the bond coat layer by thermal spraying. The rare earth silicate-based hermetic layer comprises a thermal sprayed coating comprising a rare earth silicate having a hermetic microstructure having a density of 85% or more of its theoretical density. As provided herein, in various other embodiments, the rare earth silicate-based hermetic layer comprises a thermal sprayed coating comprising a rare earth silicate having a hermetic microstructure having a density of 90% or more of its theoretical density, 95% or more of its theoretical density, or 97% or more of its theoretical density.

The various embodiments of the rare earth silicate-based hermetic layer as disclosed herein also relate to the environmental barrier coating. Therefore, for example, the hermetic microstructure of the rare earth silicate-based hermetic layer of the environmental barrier coating comprises a closed porosity, where the closed porosity comprises a porosity by volume of less than about 15 percent. As provided herein, in various other embodiments, the closed porosity comprises a porosity by volume of less than about 10 percent, less than about 5 percent, or less than about 3 percent.

As provided herein, in certain embodiments, the bond coat layer of the environmental barrier coating comprises a thickness of between about 1 micrometer and about 200 micrometers, and the at least one rare earth silicate-based hermetic layer comprises a thickness of between about 5 micrometers and about 1,200 micrometers. In various embodiments, the bond coat layer can have a thickness ranging from about 1-150 micrometers, about 1-100 micrometers, about 1-75 micrometers, about 1-50 micrometers, about 1-25 micrometers, about 1-10 micrometers, and the like. In various other embodiments, the at least one rare earth silicate-based hermetic layer comprises a thickness range of between about 10-1,000 micrometers, 10-800 micrometers, 10-500 micrometers, 10-400 micrometers, 10-300 micrometers, 10-200 micrometers, 10-100 micrometers, 10-50 micrometers, and the like.

In one embodiment of the environmental barrier coating, the at least one rare earth silicate-based hermetic layer comprises a first layer comprising a first rare earth silicate and a second layer comprising a second rare earth silicate, with the first layer being deposited between the bond coat layer and the second layer. In one embodiment, the first rare earth silicate is $(Yb_x,Y_{1-x})_2Si_2O_7$, where $0 \leq x \leq 1$ and the second rare earth silicate is $(Yb_y-Y_{1-y})_2SiO_5$, where $0 \leq y \leq 1$. In a particular embodiment, the first rare earth silicate is $(Yb_{0.6}Y_{0.4})_2Si_2O_7$ and the second rare earth silicate is $Y_2SiO_5$. In certain embodiments, a non-hermetic layer is deposited between the bond coat layer and the first layer. An example of a suitable non-hermetic layer for depositing between the bond coat layer and the first layer can include, without limitation, a non-hermetic layer comprising a rare earth silicate that can be, without limitation, $(Yb_x,Y_{1-x})_2Si_2O_7$ where $0 \leq x \leq 1$.

Figure 2:
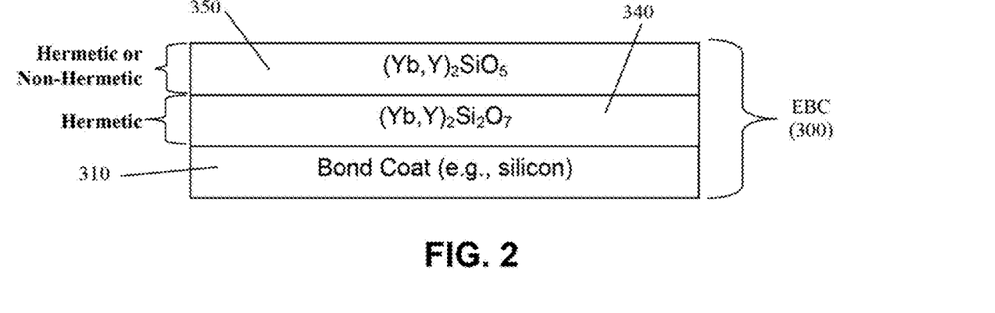
FIG. 2 is a schematic cross sectional view of one embodiment of an environmental barrier coating in accordance with the present disclosure.

As set forth herein above, FIG. 1 is a schematic cross sectional view of a prior art EBC having non-hermetic rare earth silicate-based layers. As shown in FIG. 1, EBC 200 includes bond coat 210 (e.g., silicon), $(Yb,Y)_2Si_2O_7$ layer 220, BSAS layer 230, $(Yb,Y)_2Si_2O_7$ layer 240, and $(Yb,Y)_2SiO_5$ layer 250. BSAS layer 230 provides a glassy hermetic layer. However, because BSAS layer 230 cannot be allowed to come into contact with silicon bond coat 210, $(Yb,Y)_2Si_2O_7$ layer 220 must be inserted between silicon bond coat 210 and BSAS layer 230. Thus, the EBC shown in FIG. 1 requires additional layers that are not required by the EBC of the present disclosure. By way of contrast, as shown in FIG. 2, EBC 300 of the present disclosure includes a bond coat 310 (e.g., silicon) having a hermetic $(Yb,Y)_2Si_2O_7$ layer 340 and a $(Yb,Y)_2SiO_5$ layer 350 layered onto bond coat 310. In various embodiments of EBC 300 of FIG. 2, $(Yb,Y)_2SiO_5$ layer 350 may be either hermetic or non-hermetic.

According to another aspect, the present disclosure provides an article having an environmental barrier coating, where the article comprises: a substrate comprising a ceramic matrix composite; and an environmental barrier coating deposited on a surface of the substrate. The environmental barrier coating of the article comprises: a bond coat layer comprising silicon; and at least one rare earth silicate-based hermetic layer deposited on the bond coat layer by thermal spraying, where the rare earth silicate-based hermetic layer comprises a thermal sprayed coating comprising a rare earth silicate having a hermetic microstructure having a density of 85% or more of its theoretical density. As provided herein, in various other embodiments, the rare earth silicate-based hermetic layer comprises a thermal sprayed coating comprising a rare earth silicate having a hermetic microstructure having a density of 90% or more of its theoretical density, 95% or more of its theoretical density, or 97% or more of its theoretical density. In certain embodiments, a non-hermetic layer is deposited between the bond coat layer and the at least one rare earth silicate-based hermetic layer of the environmental barrier coating of the article. An example of a suitable non-hermetic layer for use in the environmental barrier coating of the article can include, without limitation, a non-hermetic layer comprising a rare earth silicate that can be, without limitation, $(Yb_x, Y_{1-x})_2Si_2O_7$ where $0 \leq x \leq 1$.

Figure 3:
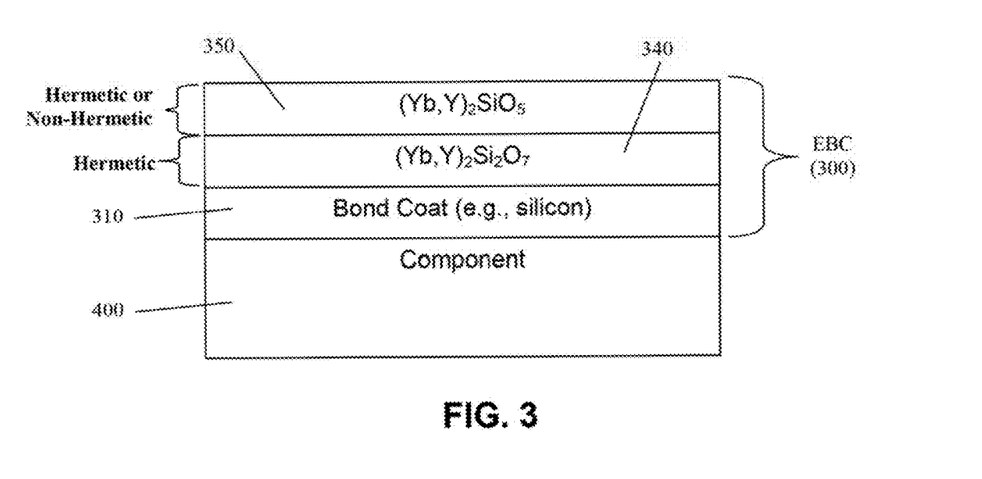
FIG. 3 is a schematic cross sectional view of one embodiment of an article having an environmental barrier coating in accordance with the present disclosure.

Referring to FIG. 3, there is shown a schematic cross sectional view of one embodiment of an article in accordance with the present disclosure. As shown, component 400 includes an environmental barrier coating 300 that comprises a bond coat 310 (e.g., silicon) having a rare earth silicate-based hermetic layer that comprises a hermetic $(Yb,Y)_2Si_2O_7$ layer 340 and a $(Yb,Y)_2SiO_5$ layer 350 layered onto bond coat 310. In various embodiments of EBC 300 of FIG. 3, $(Yb,Y)_2SiO_5$ layer 350 may be either hermetic or non-hermetic.

Figure 4:
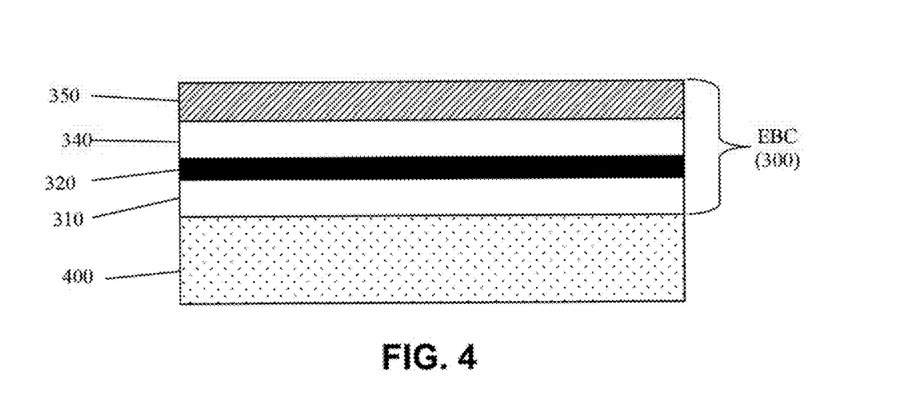
FIG. 4 is a schematic cross sectional view of one embodiment of a component having an environmental barrier coating in accordance with the present disclosure.

Referring to FIG. 4, there is shown a schematic cross sectional view of another embodiment of an article in accordance with the present disclosure. As shown, component 400 includes an environmental barrier coating 300 that comprises a bond coat 310 (e.g., silicon) having a rare earth silicate-based hermetic layer that comprises a hermetic $(Yb,Y)_2Si_2O_7$ layer 340 and a $(Yb,Y)_2SiO_5$ layer 350 layered onto bond coat 310, and further with an optional non-hermetic layer 320 between bond coat 310 and hermetic $(Yb,Y)_2Si_2O_7$ layer 340. In various embodiments of EBC 300 of FIG. 4, $(Yb,Y)_2SiO_5$ layer 350 may be either hermetic or non-hermetic. An example of a suitable optional non-hermetic layer 320 can include, without limitation, a non-hermetic layer comprising a rare earth silicate that can be, without limitation, $(Yb_x, Y_{1-x})_2Si_2O_7$ where $0 \leq x \leq 1$.

Various articles can include the environmental barrier coating of the present disclosure. For example, in various embodiments, the articles of the present disclosure can include, without limitation, a turbine engine component selected from the group consisting of a combustor component, turbine blades, shrouds, nozzles, heat shields, and vanes.

According to another aspect, the present disclosure provides a thermal spray feedstock for producing a rare earth silicate-based hermetic layer. The thermal spray feedstock comprises a suspension comprising a rare earth silicate and a sintering aid suspended in a liquid carrier, where the sintering aid comprises an oxide or a plurality of oxides, and where thermal spraying of the suspension is effective to yield a rare earth silicate-based hermetic layer comprising a rare earth silicate having a hermetic microstructure having a density of 85% or more of its theoretical density. As provided herein, in various other embodiments, the rare earth silicate-based hermetic layer comprises a rare earth silicate having a hermetic microstructure having a density of 90% or more of its theoretical density, 95% or more of its theoretical density, or 97% or more of its theoretical density.

The various characteristics and embodiments of the rare earth silicate-based hermetic layer as disclosed herein also relate to the thermal spray feedstock for producing a rare earth silicate-based hermetic layer. For example, suitable rare earth silicates for use in the rare earth silicate-based hermetic layer produced by the thermal spray feedstock can include, without limitation, a rare earth element selected from the group consisting of ytterbium (Yb), yttrium (Y), scandium (Sc), lutetium (Lu), lanthanum (La), cerium (Ce), praseodymium (Pr), neodymium (Nd), samarium (Sm), dysprosium (Dy), holmium (Ho), erbium (Er), thulium (Tm), europium (Eu), gadolinium (Gd), terbium (Tb), promethium (Pm), and a mixture thereof. In various embodiments, the rare earth silicate is $(Yb_x, Y_{1-x})_2Si_2O_7$ where $0 \leq x \leq 1$ or $(Yb_y, Y_{1-y})_2SiO_5$ where $0 \leq y \leq 1$ or mixtures thereof. In a particular embodiment, the rare earth silicate is $(Yb_{0.6}Y_{0.4})_2Si_2O_7$.

In certain embodiments of the thermal spray feedstock, the suspension comprises from about 1 wt % to about 40 wt % of the rare earth silicate. In other embodiments of the thermal spray feedstock, the suspension comprises from about 3 wt % to about 30 wt % of the rare earth silicate. In other embodiments of the thermal spray feedstock, the suspension comprises from about 5 wt % to about 20 wt % of the rare earth silicate.

In certain embodiments of the thermal spray feedstock, the rare earth silicate is in a form of a particle having an outside diameter of between about 0.01 micrometers and about 15 micrometers. In other embodiments of the thermal spray feedstock, the rare earth silicate is in a form of a particle having an outside diameter of between about 0.1 micrometers and about 10 micrometers. In other embodiments of the thermal spray feedstock, the rare earth silicate is in a form of a particle having an outside diameter of between about 0.4 micrometers and about 8 micrometers.

In certain embodiments of the thermal spray feedstock, the suspension comprises less than about 5 wt % of the sintering aid.

In certain embodiments of the thermal spray feedstock, the sintering aid is selected from the group consisting of metallic iron, $Al_2O_3$, $Fe_3O_4$, $SiO_2$, and $Fe_2O_3$. In certain embodiments, a suspension comprising the plurality of sintering aid oxides comprises from about 0 wt % to about 0.5 wt % of $Al_2O_3$, from about 0.5 wt % to about 2 wt % of $Fe_3O_4$, and from about 0 wt % to about 2 wt % of $SiO_2$.

In certain embodiments, the sintering aid oxide is in a form of a fine particle having an outside diameter of between about 5 nanometers and about 3 micrometers, between about 5 nanometers and about 100 nanometers, between about 30 nanometers and about 70 nanometers. In particular embodiments, the sintering aids are nanopowders and the rare earth silicates are micron-sized.

In certain embodiments the thermal spray feedstock comprises a liquid carrier. Suitable liquid carriers can include, without limitation, alcohols, water, and mixtures thereof. In a particular embodiment, the liquid carrier is an alcohol, and more specifically ethanol, although any other alcohols can be used. Other liquids can be used as the liquid carrier and generally evaporate in the process. While water and alcohols are the more common liquid carriers, the present disclosure covers the use of any suitable liquid carrier for the thermal spray feedstock.

In certain embodiments, the thermal spray feedstock can further comprise a surfactant. Suitable surfactants can include, without limitation, polytheyleneimine, polyvinylpyrrolidone, salts of polymethacrylate, and other dispersants common to ceramic processing.

According to another aspect, the present disclosure provides a method for making a rare earth silicate-based hermetic layer. This method includes the following steps: providing a thermal spray feedstock according to the present disclosure; and subjecting the thermal spray feedstock to a thermal spraying process to produce a rare earth silicate-based hermetic layer comprising a rare earth silicate having a hermetic microstructure having a density of 85% or more of its theoretical density. As provided herein, in various other embodiments, the rare earth silicate-based hermetic layer comprises a rare earth silicate having a hermetic microstructure having a density of 90% or more of its theoretical density, 95% or more of its theoretical density, or 97% or more of its theoretical density.

According to another aspect, the present disclosure provides a method for producing a substrate having an environmental barrier coating. This method includes the following steps: providing a substrate comprising a ceramic matrix composite; and applying an environmental barrier coating to the substrate. The environmental barrier coating includes: a bond coat layer comprising silicon; and at least one rare earth silicate-based hermetic layer deposited on the bond coat layer by thermal spraying. The rare earth silicate-based hermetic layer comprises a thermal sprayed coating comprising a rare earth silicate having a hermetic microstructure having a density of 85% or more of its theoretical density. As provided herein, in various other embodiments, the rare earth silicate-based hermetic layer comprises a rare earth silicate having a hermetic microstructure having a density of 90% or more of its theoretical density, 95% or more of its theoretical density, or 97% or more of its theoretical density.

As provided herein, the present disclosure describes a chemical composition that allows an environmental barrier coating (EBC) to be thermally sprayed to a hermetic state. The present disclosure provides for reducing the number of EBC layers necessary to protect a ceramic matrix composite (CMC), for example from five to three. In one embodiment, the present disclosure involves the addition of iron oxide, aluminum oxide, or any other sintering aid for a rare earth (e.g., Yb, Y, Sc, Lu, etc.) silicate to the thermal spray powder feed. These sintering aides reduce the sintering temperature of the rare earth silicate substantially, which allow the coating to sinter in-situ to a hermetic density (typically >85% of the theoretical rare earth silicate density). As provided herein, sintering can also be carried out ex-situ.

As described herein, the present disclosure provides a means for lowering the sintering temperature of rare-earth silicate materials such as (Yb and/or Y)$_2$Si$_2$O$_7$ and (Yb and/or Y)$_2$SiO$_5$. Thus, the thermal spray layer deposited with a sintering aid eliminates the need for the glassy layer and the separation layer.

In various embodiments, sintering can be accomplished by heating a dried component at a rate of from about 1° C./min to about 15° C./min to a temperature of from about 1100° C. to about 1700° C. and holding the component at that temperature for from about 0 to about 24 hours. In other embodiments, sintering can be accomplished by heating the coated component at a rate of from about 5° C./min to about 15° C./min to a temperature of from about 1300° C. to about 1375° C. and holding the component at that temperature for from about 0 to about 24 hours.

In accordance with aspects of the present disclosure, the bond coat layer may be applied by thermal spray processes, chemical vapor deposition processes, electron beam physical vapor deposition processes, dipping in molten silicon, sputtering processes, and other conventional application processes known to those skilled in the art.

EXAMPLES

The following examples are intended to illustrate particular embodiments, but are by no means intended to limit the scope of the present systems and techniques.

Example 1

Suspension Thermal Spray for Hermetic (Yb,Y)$_2$Si$_2$O$_7$ Layer

One exemplary method for making a suspension thermal spray for hermetic (Yb,Y)$_2$Si$_2$O$_7$ layer is set forth below.

A liquid feedstock is fed to a thermal spray process. The liquid feedstock comprises: a liquid carrier (Ethanol); suspended (Yb,Y)$_2$Si$_2$O$_7$ particles; a surfactant (PEI); sintering aids (Al$_2$O$_3$, Fe$_3$O$_4$ and SiO$_2$); and sintering aids are added to the suspension in the form of fine particles. The liquid feedstock is fed in the process using a peristaltic pump which carries it from a stirred vessel to the thermal spray process. The thermal spray process is either a plasma spray torch or a High Velocity Oxi-Fuel torch (HVOF).

The thermal spray process parameters are adjusted so that upon interaction with the thermal spray process, the suspended particles are liberated from the liquid carrier, heated and accelerated toward a substrate. Further, the at least partially molten particles are deposited onto the substrate surface to form a coating. For plasma spray, the main process parameters are gun power and stand-off distance between the torch and the substrate to be coated. For HVOF, the main process parameters are gas flow rates and composition, and stand-off distance between the torch and the substrate to be coated.

Figure 5:
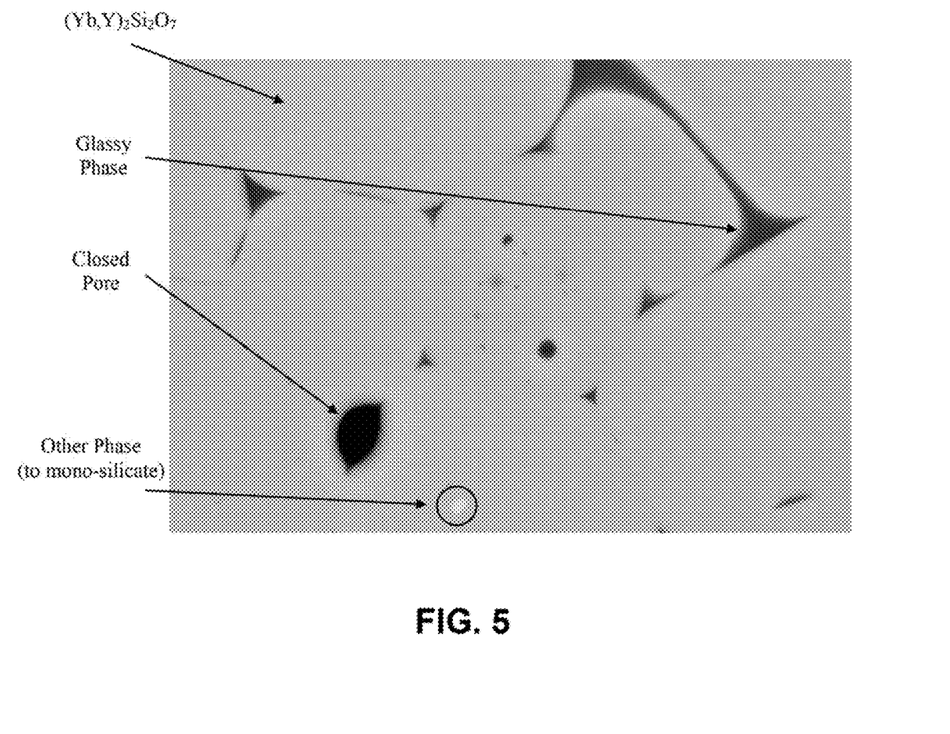
FIG. 5 is a micrograph of one embodiment of a thermal spray hermetic (Yb,Y)$_2$Si$_2$O$_7$ layer in accordance with the present disclosure.
Figure 6A:
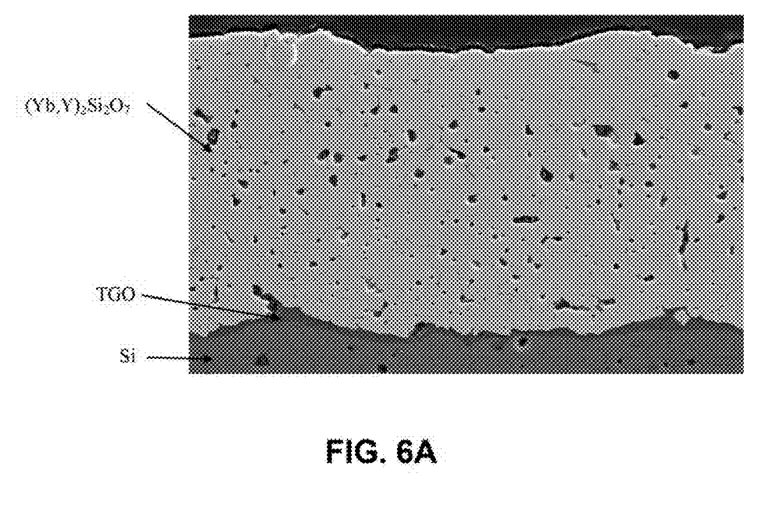
FIGS. 6A-6C are micrographs of various embodiments of hermetic (Yb,Y)$_2$Si$_2$O$_7$ layers in accordance with the present disclosure. The layers are shown after steam testing for hermeticity.
Figure 6B:
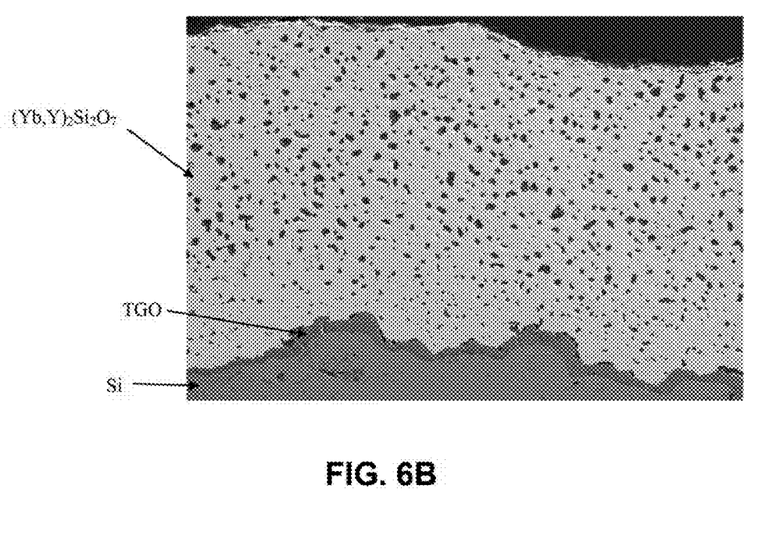
Figure 6C:
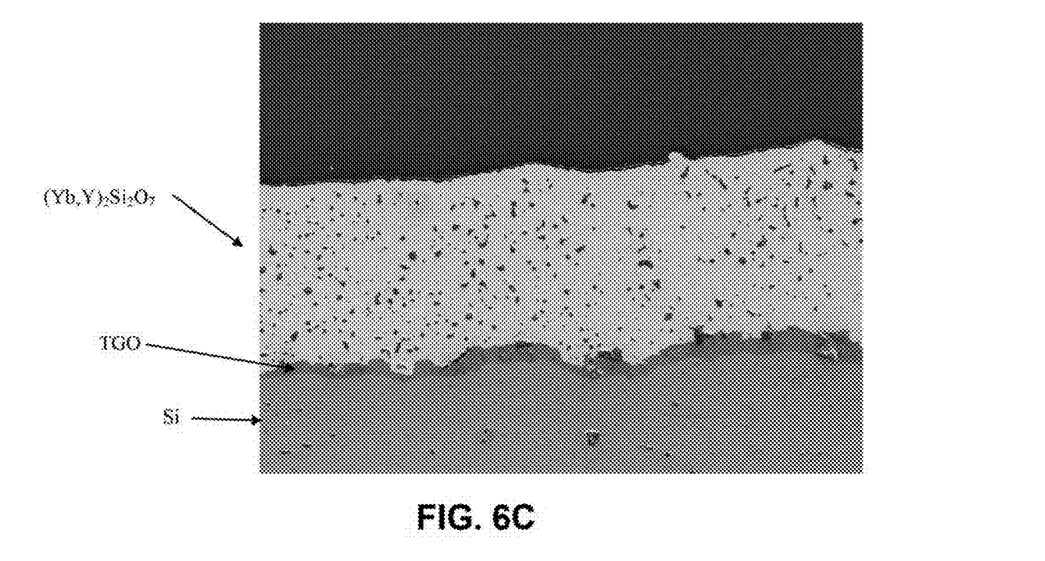

The coated substrate is heat-treated to sinter the microstructure. FIG. 5 shows one embodiment of the constituents of the final coating. As shown in FIGS. 6A-6C, the resulting coating is hermetic and is composed of: dense $(Yb,Y)_2Si_2O_7$ phase; closed porosity; glassy phase; and other phase (e.g., maybe from Yb, Y, Si, Al, Fe, O and mixtures thereof).

Example 2

Feedstock Material

One exemplary method for making a feedstock is set forth as follows: Starting powder: $(Yb,Y)_2Si_2O_7$ from St-Gobain (DV 1099—fines). Starting powder wet milled to size in denatured ethanol (Fisher A-407). Milled slurry diluted with denatured ethanol to achieve desired concentration. Addition of surfactant (PEI from Alfa Aesar) to stabilize suspension. Add <0.07% PEI. Mix sintering aids in suspension: 1 mol % $Al_2O_3$, from Alfa Aesar #44931; 2 mol % $Fe_3O_4$ from Sigma Aldrich #637106; and 1 wt % $SiO_2$, from Sigma Aldrich #381276. Sample feedstock materials are set forth in Table 1. The solid concentration and particle size distribution of the $(Yb,Y)_2Si_2O_7$ particles in the sample feedstock materials are listed in Table 1.

TABLE 1

| | Feedstock Material | | | |
|---|---|---|---|---|
| Feedstock ID | Wt % | $D_{50}$ (μm) | $D_{10}$ (μm) | $D_{90}$ (μm) |
| 1-A | 10 | 0.98 | 0.55 | 2.00 |
| 1-B | 5 | 0.99 | 0.51 | 2.48 |
| 2-A | 20 | 1.97 | 0.65 | 5.05 |
| 2-B | 5 | 2.09 | 0.66 | 5.04 |
| 2-C | 10 | 1.85 | 0.63 | 4.46 |
| 2-D | 10 | 1.96 | 0.65 | 5.00 |
| NSI* | 5 | 1.95 | 0.64 | 4.72 |
| 3-A | 10 | 2.88 | 0.73 | 7.32 |
| 3-B | 10 | 3.37 | 0.78 | 7.75 |

TABLE 1-continued

| | Feedstock Material | | | |
|---|---|---|---|---|
| Feedstock ID | Wt % | $D_{50}$ (μm) | $D_{10}$ (μm) | $D_{90}$ (μm) |

*This suspension does not have any sintering aids mixed in suspension.

Example 3

Spray Conditions

Exemplary spray conditions for use in the present disclosure are provided below and set forth in Table 2 and Table 3. Various materials and methods include the following: Plasma gun: Axial III from Northwest Mettech Corp., Vancouver, Canada; HVOF gun: GTV-770.000-AUS, Genie Products, Brevard, N.C., USA; and Peristaltic feed pump: Watson Marlow, 520 Series EA, Model 520SN/REH.

TABLE 2

| | Plasma Spray Conditions | | |
|---|---|---|---|
| Spray condition ID | Feedstock ID | Power (kW) | Stand-Off Distance (cm) |
| P-1 | 1-B | 51 | 7.6 |
| P-2 | 2-B | 79 | 6.4 |
| P-3 | 3-A | 78 | 6.4 |
| P-4 | 2-D | 79 | 6.4 |

TABLE 3

| | HVOF Spray Conditions | | | | |
|---|---|---|---|---|---|
| Spray Condition ID | Feedstock ID | H2 flow Scfh (140 psi) | O2 flow Scfh (170 psi) | Air cap flow scfh (100 psi) | Stand-off Distance (cm) |
| H-1 | 1-A | 65 | 35 | 28 | 10.2 |
| H-2 | 2-A | 65 | 35 | 28 | 12.7 |
| H-3 | 3-B | 65 | 35 | 28 | 12.7 |
| H-4 | 2-C | 65 | 35 | 28 | 12.7 |
| H-5 | NSI | 65 | 35 | 28 | 12.7 |

Example 4

Heat Treatments

Exemplary heat treatment conditions for use in the present disclosure are provided below and set forth in Table 4. Samples were treated in an air furnace.

TABLE 4

| | Plasma Spray Conditions | | | | |
|---|---|---|---|---|---|
| Heat-treatment ID | Starting temperature (° C.) | Final temperature (° C.) | Ramp rate (° C./min) | Hold time at temperature (hours) | Cooling |
| HT-1 | 20 | 1344 | 5 | 10 | Furnace cool |
| HT-2 | 20 | 1315 | 5 | 10 | Furnace cool |
| HT-3 | 20 | 1315 | 5 | 50 | Furnace cool |

Example 5

Steam Testing for Hermeticity

Exemplary steam testing for hermeticity examples are provided below. The samples included a $(Yb,Y)_2Si_2O_7$ layer on an Si coated SiC button. Atmosphere: $P_{H2O}=0.9$ atmosphere; and $P_{O2}=0.1$ atmosphere. 500 hours test and 250 cycles. A 2-hour cycle was conducted as follows: Start at room temperature (~20° C.); Lower sample in hot zone (1315° C.); Soak at 1315° C. for ~106 minutes; Raise sample out of hot zone (room temperature); and Soak at room temperature for 10 minutes (in the furnace, samples are at 1315° C.; samples cool down to less than 100° C. when they are soaked at room temperature for 10 minutes). Characterization: Thickness of thermally grown oxide (TGO) layer on Si bond coat. Criteria for hermeticity: Hermetic layer when TGO≤~6 μm. Various conditions and aspects of the samples are provided in Table 5.

TABLE 5

Steam Tested Samples

| Sample ID | Spray Condition ID | Heat-Treatment ID | TGO Thickness (std. deviation) (μm) | Hermetic? |
|---|---|---|---|---|
| P1-1344 | P-1 | HT-1 (1344° C., 10 hours) | >20 | No |
| P2-1344 | P-2 | HT-1 (1344° C., 10 hours) | 5.1 (2.2) | Yes |
| P3-1344 | P-3 | HT-1 (1344° C., 10 hours) | 15.3 (6.0) | No |
| H1-1344 | H-1 | HT-1 (1344° C., 10 hours) | >20 | No |
| H2-1344 | H-2 | HT-1 (1344° C., 10 hours) | 4.4 (2.1) | Yes |
| H3-1344 | H-3 | HT-1 (1344° C., 10 hours) | 4.7 (2.5) | Yes |
| P4-1315-10 | P-4 | HT-2 (1315° C., 10 hours) | 17.0 (2.2) | No |
| H4-1315-10 | H-4 | HT-2 (1315° C., 10 hours) | 16.7 (8) | No |
| P4-1315-50 | P-4 | HT-3 (1315° C., 50 hours) | 5.0 (1.9) | Yes |
| H4-1315-50 | H-4 | HT-3 (1315° C., 50 hours) | 6.1 (3.2) | Yes |
| H5-1344 | H-5 | HT-1 (1344° C., 10 hours) | 6.8 (7.6) | No |

Figure 7A:
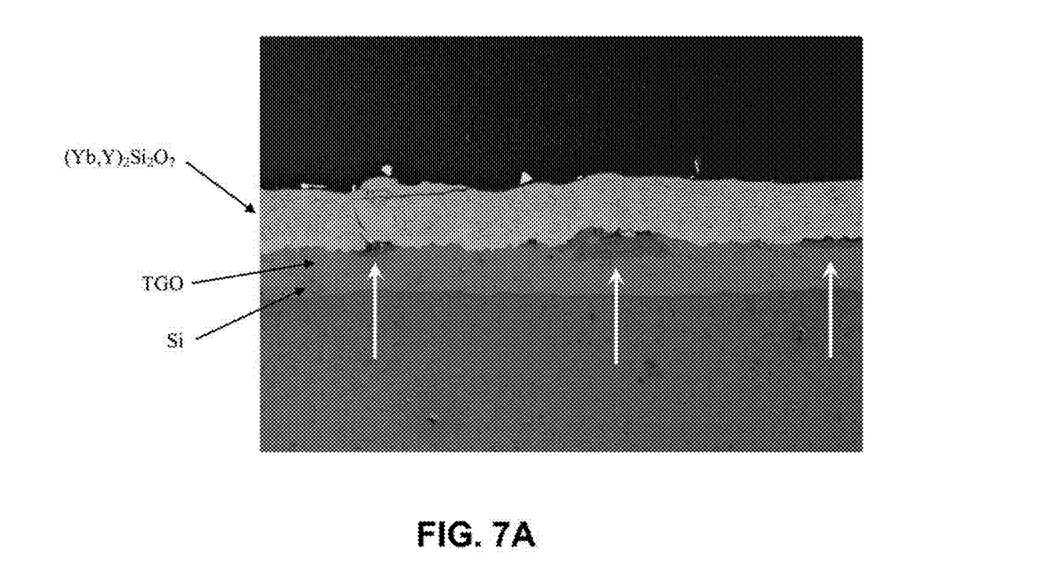
FIGS. 7A-7B are micrographs of various embodiments of non-hermetic (Yb,Y)$_2$Si$_2$O$_7$ layers described in the present disclosure.
Figure 7B:
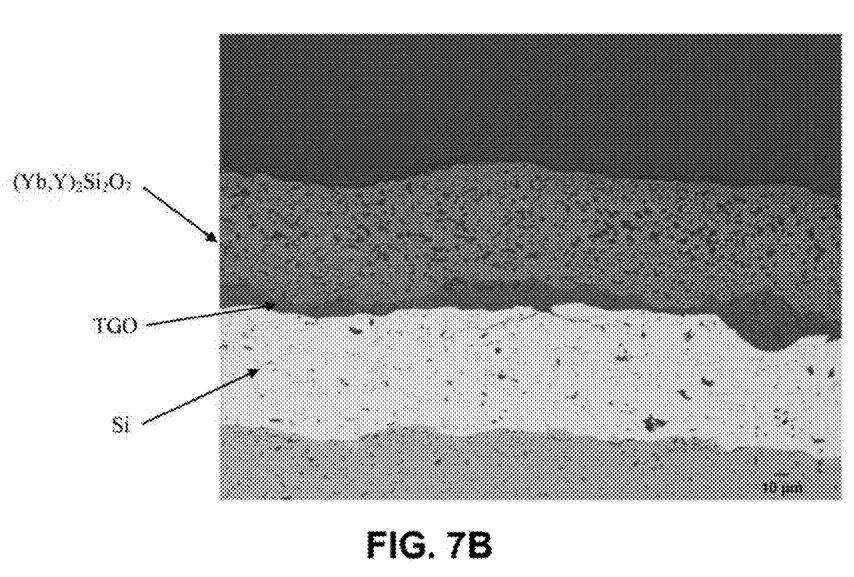

Examples of steam tested hermetic coatings are illustrated in FIG. 6A (Sample H2-1344), FIG. 6B (Sample H4-1315-50), and FIG. 6C (Sample P2-1344). By way of comparison, examples of non-hermetic coatings are illustrated in FIG. 7A (Sample H5-1344), and FIG. 7B (Sample P3-1344), Although various embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed is:

1. An environmental barrier coating comprising:
a bond coat layer comprising silicon;
at least one rare earth silicate-based hermetic layer deposited on the bond coat layer by thermal spraying; and
a non-hermetic layer deposited between the bond coat layer and the at least one rare earth silicate-based hermetic layer,
wherein said rare earth silicate-based hermetic layer comprises a thermal sprayed coating comprising a rare earth silicate having a hermetic microstructure having a density of 85% or more of its theoretical density, wherein said at least one rare earth silicate-based hermetic layer comprises a first layer comprising a first rare earth silicate and a second layer disposed on and in contact with the first layer and comprising a second rare earth silicate, said first layer being deposited between the bond coat layer and the second layer, and wherein the first rare earth silicate is $(Yb_{0.6}Y_{0.4})_2Si_2O_7$ and the second rare earth silicate is $Y_2SiO_5$.

2. The environmental barrier coating according to claim 1, wherein the hermetic microstructure comprises a closed porosity, said closed porosity comprising a porosity by volume of less than about 15 percent and the thermal sprayed coating has a thickness of between about 5 micrometers and about 1,200 micrometers.

3. The environmental barrier coating according to claim 1, wherein the hermetic microstructure comprises a closed porosity, said closed porosity comprising a porosity by volume of less than about 15 percent and the rare earth silicate comprises from about 90 wt % to about 99.5 wt % of the thermal sprayed coating.

4. The environmental barrier coating according to claim 1, wherein the hermetic microstructure comprises a closed porosity, said closed porosity comprising a porosity by volume of less than about 15 percent and the hermetic microstructure of the rare earth silicate is formed by sintering the rare earth silicate in-situ or ex-situ with a sintering aid comprising an oxide or a plurality of oxides and the sintering aid is selected from the group consisting of metallic iron, $Al_2O_3$, $Fe_3O_4$, $SiO_2$, $Fe_2O_3$, and $LiYO_2$.

5. The environmental barrier coating according to claim 1, wherein the thermal sprayed coating has a thickness of between about 5 micrometers and about 1,200 micrometers and the rare earth silicate comprises from about 90 wt % to about 99.5 wt % of the thermal sprayed coating.

6. The environmental barrier coating according to claim 1, wherein the thermal sprayed coating has a thickness of between about 5 micrometers and about 1,200 micrometers and the hermetic microstructure of the rare earth silicate is formed by sintering the rare earth silicate in-situ or ex-situ with a sintering aid comprising an oxide or a plurality of oxides and the sintering aid is selected from the group consisting of metallic iron, $Al_2O_3$, $Fe_3O_4$, $SiO_2$, $Fe_2O_3$, and $LiYO_2$.

7. The environmental barrier coating according to claim 1, wherein the hermetic microstructure comprises a dense rare earth silicate phase and an optional glassy phase.

8. The environmental barrier coating according to claim 1, wherein the thermal sprayed coating has a thickness of between about 5 micrometers and about 1,200 micrometers.

9. The rare earth silicate-based hermetic layer according to claim 1, wherein the rare earth silicate additionally comprises a rare earth element selected from the group consisting of ytterbium (Yb), yttrium (Y), scandium (Sc), lutetium (Lu), lanthanum (La), cerium (Ce), praseodymium (Pr), neodymium (Nd), samarium (Sm), dysprosium (Dy), holmium (Ho), erbium (Er), thulium (Tm), europium (Eu), gadolinium (Gd), terbium (Tb), promethium (Pm), and a mixture thereof.

10. The environmental barrier coating according to claim 1, wherein the hermetic microstructure comprises a closed porosity, said closed porosity comprising a porosity by volume of less than about 15 percent.

11. The environmental barrier coating according to claim 1, wherein the bond coat layer comprises a thickness of between about 1 micrometer and about 200 micrometers, and the at least one rare earth silicate-based hermetic layer comprises a thickness of between about 5 micrometers and about 1,200 micrometers.

12. An article, comprising:
- a substrate comprising a ceramic matrix composite; and
- an environmental barrier coating according to claim 1 deposited on a surface of the substrate.

13. The article according to claim 12, wherein the article comprises a turbine engine component selected from the group consisting of a combustor component, turbine blades, shrouds, nozzles, heat shields, and vanes.

* * * * *